June 8, 1937. J. McC. GARRIS 2,082,828
SLING
Filed Feb. 20, 1936 2 Sheets-Sheet 2
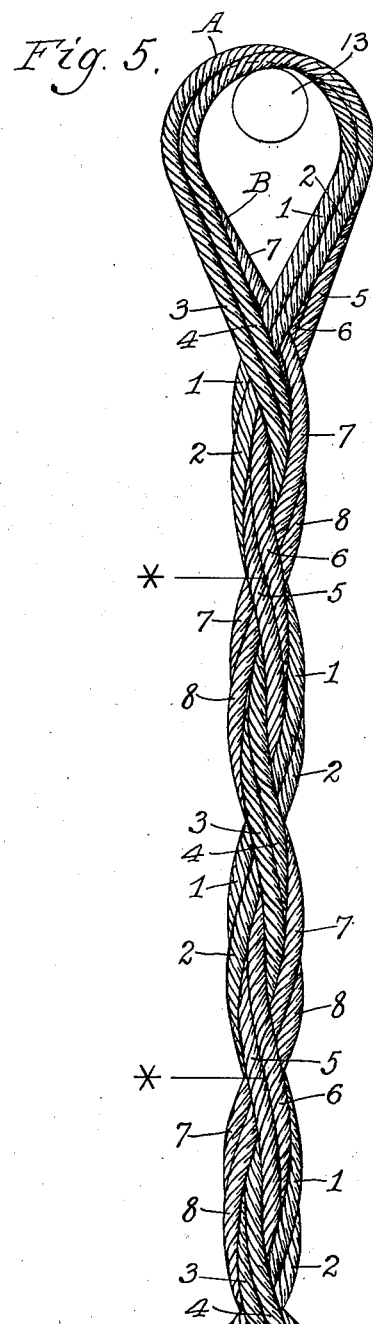
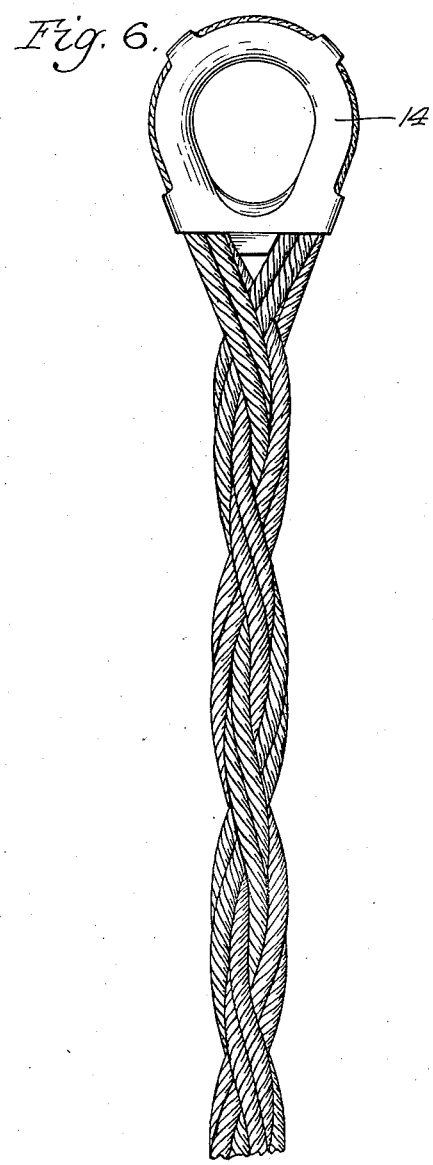
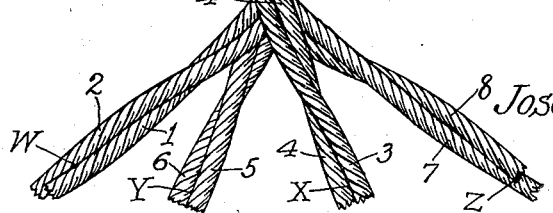

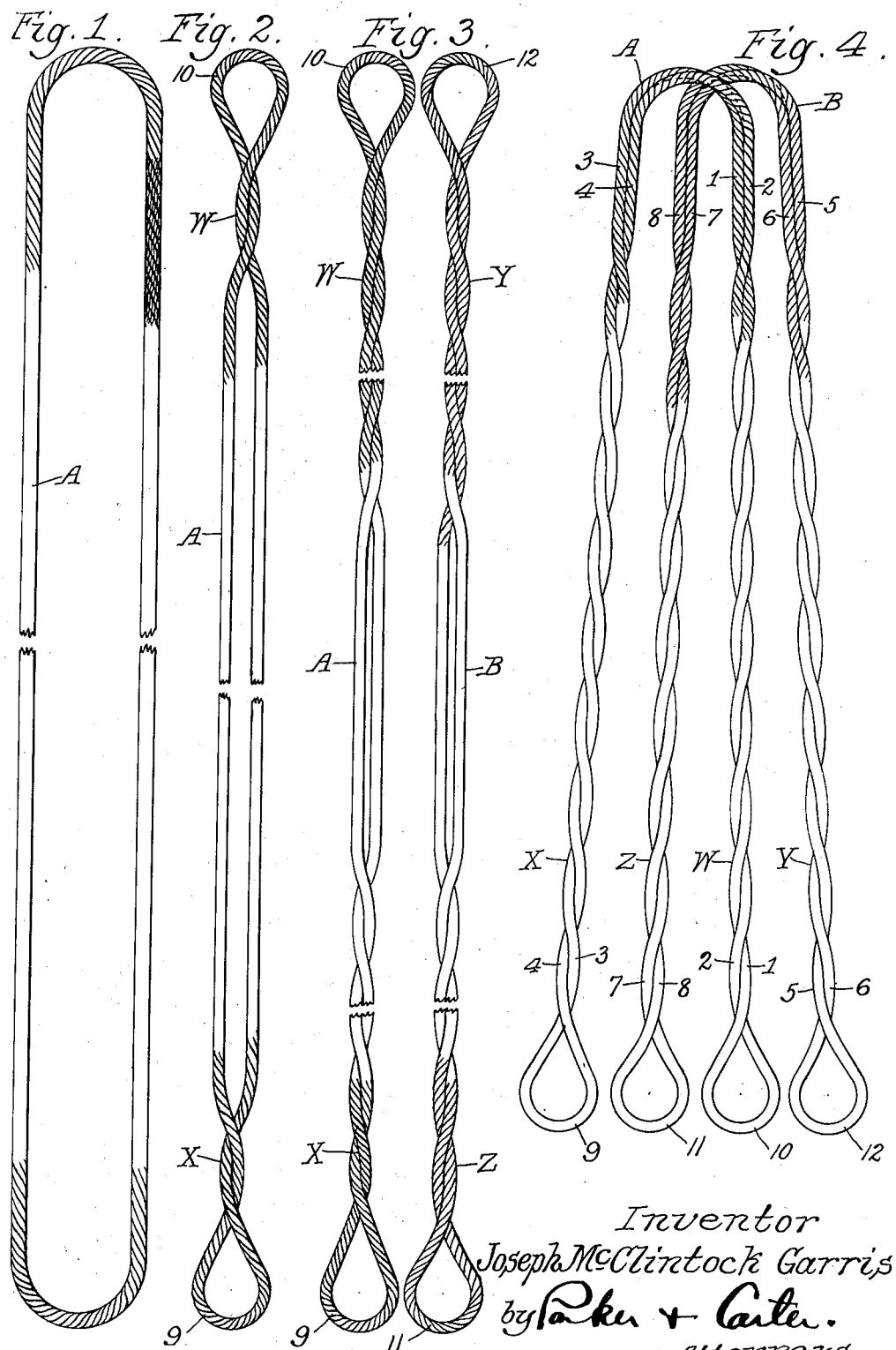

Patented June 8, 1937

2,082,828

UNITED STATES PATENT OFFICE 2,082,828

SLING

Joseph McClintock Garris, Avalon, Pa., assignor to Macwhyte Company, Kenosha, Wis., a corporation of Illinois Application February 20, 1936, Serial No. 64,921

14 Claims. (Cl. 96—25)

This invention relates primarily to slings and may be embodied in slings made of rope which is itself formed of any material, such as manila, hemp or any other non-metallic substance. The invention may also be embodied in slings made of wire, wire rope or cable.

It has for one object to provide a sling made of a series of endless units which are made of sections or pieces of rope, cable or wire which sections are made into endless loops in any desired manner, by welding, splicing or otherwise, and in which, after the sections or pieces have been made endless, a suitable shape and arrangement is given, prior to braiding, but after the formation of the endless unit.

Another object is to provide a sling made up of a plurality of such endless units, preferably an even number of such units, in which, after the unit has been made endless, its parts are crossed over to give a desired arrangement for braiding and in which an equal number of oppositely crossed units is used. Thus one sling may be made of two such units.

Other objects will appear from time to time in the specification and claims.

The invention is illustrated more or less diagrammatically in the accompanying drawings, wherein:—

Figure 1 is a unit after it has been made endless and before it has been shaped to provide the cross-overs;

Figure 2 is a unit showing the commencement of the crossing operation;

Figure 3 illustrates two completed units and as shown they are provided with opposite crossovers;

Figure 4 illustrates the two units of Figure 3, placed together preparatory to braiding;

Figure 5 shows a portion of the braid with the work in the braiding or working position;

Figure 6 illustrates a completed end of the sling after a thimble has been placed in the eye.

Like parts are designated by like characters throughout the specification and drawings.

The several slings and sling units shown in the drawings are broken away in part to permit the use of a larger scale. While the eye may be of any desired size, the eyes shown are smaller in proportion to the remainder of the sling than is ordinarily used.

While a sling made of two units only is shown, it is to be understood that more units may be used. In the sling units shown, for example, in Figures 3 and 4, right lay rope is used in one unit and left lay in the other. This has certain advantages but is not an essential requirement and right lay rope might be used in both units or left lay rope might be used in both units. In preparing the units after they have been made endless, some may be crossed over from one direction and others may be oppositely crossed, this thus giving oppositely crossed units as shown in Figure 3, or the units might all be crossed in one direction and then the necessary number might be reversed end for end, and laid with the unit which has not been reversed, thus producing the effect desired without the necessity of actually crossing the units in opposite directions.

Thus whether the units in their manufacture are all crossed one way or whether some are crossed one way and others are crossed in reverse, when pairs of units are assembled preparatory to braiding, they are assembled in such pairs as those shown in Figure 3 in which there is included in each pair two units oppositely crossed with respect to each other. The purpose of shaping the units with cross-overs is to cause the sling members before braiding to have approximately the shape which they will have when finally braided into the sling. In other words, the cross-overs conform to the convolutions which are finally given to the members when braided into the sling.

The steps of the process of forming the sling comprise, therefore, the following: First an endless unit is made. Then this unit is shaped to provide an equal number of cross-overs running from a point near the center to its ends and the cross-overs of each sling member or half of the unit are thus in opposite directions from each other. A blank or uncrossed section remains at the center and a slight distance toward each end from the center of the unit. Two or more units so shaped, with the desired number and direction of cross-overs, are associated together as shown in Figure 4. The central portions being brought together to serve as one eye of the sling, braiding takes place from that eye toward the opposite or free ends of the sling units.

In Figure 1 is shown the unit after it has been made endless. The unit is designated as A in this figure. In Figure 2 of the unit A is shown after the commencement of making the crossovers. In making these the unit is spiraled by laying one rope about the other alternately. Thus, spiraling at W runs in one direction and spiraling at X runs in the opposite direction. The unit A is shown in Figure 3 at the left of that figure with the spiraling completed, parts being broken away to permit the use of a larger scale.

A similar but oppositely placed, spiraled or crossed-over unit B is shown with similarly spiraled sections or sling members Y and Z.

To indicate the formation of the sling and the manner in which the units are spiraled, prior to braiding and subsequently are braided, one sling member, formed of one-half of a unit A is indicated in Figure 4 as formed of the cable portions 1 and 2 and the opposite sling member, formed of half of the same unit, as indicated in Figure 4, is formed of the cable portions 3 and 4. Correspondingly the unit B is shown as having one sling member formed of cable sections 5 and 6 and the opposite sling member as being formed of sections 7 and 8. Thus each sling unit is considered as forming when bent or folded two "sling members" and the sling as a whole is thus made of four sling members shown in Figure 4.

An eye or loop 9 is formed at one end of the unit A. A corresponding eye 10 is formed at the opposite end of that unit. An eye 11 is formed at one end of the unit B and an eye 12 is formed at the opposite end of that unit.

With the parts in the position shown in Figure 4, braiding may commence. The sling member X of the unit A is braided or "roped" with the sling member Y of the unit B, while the sling member W of the unit A is braided with the sling member Z of the unit B. The spiraling or cross-over which has been given to the units is such that the lay of each unit sling member fits into the braided sling in the manner and in the shape in which it has been laid and the sling units are thus not twisted as they are braided and are not "laid out". In effect, each sling member or each section of each unit, as it is braided, fits into the sling according to the lay which has been given it in shaping it from the simple endless unit of Figure 1 to the spiraled or crossed-over units of Figure 3.

As shown in Figure 5, the braiding has commenced and has been carried through more than a complete convolution. Braiding may be carried out in any desired manner but it is ordinarily useful to provide a hook, pin or some other fixed point 13 upon which the eyes formed by the central bent sections of the units may be placed during braiding. As shown in Figure 5 the unit A, which comprises the cable sections 1, 2, 3, and 4, is uppermost, and the unit B which comprises cable portions 5, 6, 7, and 8, is largely concealed by the unit A. In that figure the several cable portions are lettered from place to place from top to bottom of the figure to indicate the path or position which they occupy and it will be seen that sling member X braids with sling member Y and sling member Z braids with sling member W. A star has been placed at two points on Figure 5. The units in the braid accomplish one complete convolution between these stars.

As shown in Figure 6 the braid has been completed and a thimble 14 of any suitable design has been inserted. It will be understood that an eye is formed at each end of the sling and that these eyes may be finished in any desired manner, by the insertion of a thimble or otherwise. The invention is not limited, therefore, to any particular finishing of the eyes.

In the past, slings have been made of twisted units in which a twist or spiral was put into the unit before it is made endless. Where that is the case, the twist or spiral in such units is continuous from end to end. In the sling of the present invention the units are made endless before being spiraled or laid, and after being made endless the unit is spiraled from the center by laying one side of the unit over the other, alternately. Thus the lay of each sling member or half of the unit as such is opposite to the lay of the other sling member or half and whether the actual crossing operation begins at the center of the unit or at its ends, it may be described as a unit which has been spiraled from the center in opposite directions towards its ends. Thus from its center one end of the unit is spiraled in a left lay and the opposite end of the unit is spiraled in a right lay. In making a sling of such units, a suitable number, frequently two, of these endless units, is put together, bent at the middle to form the first eye and then braided from this eye to the end, where the looped ends of the units are brought together to form the second eye. Thus each unit is formed into two sling members and has an equal number of right and left crossings and is braided into the completed sling.

In each unit used in the present sling half the crossings are opposite to the rope lay and the other half are in the same direction as the rope lay, because in forming the unit, whether the crossing-forming operation or spiraling begins at the center or at the ends, the crossings for each sling member or half of the unit are in the opposite direction from those for the other sling member or half and in forming the completed sling, each sling member is braided with another unit and this provides an increased equalization in the sling body as compared to a sling made of several units in which half of each unit is braided with the other half of the same unit. Because of the manner in which the individual units are formed in the present sling, it is not necessary when braiding is to start to rope the two units together at the bend, because the units, without roping, are in correct position for braiding. This is due to the fact that each unit is bent in its center to form its two sling members and in each sling member there is a crossing, lay or spiral running in the opposite direction from that of the other sling member of the unit. Inevitably, therefore, when the two units are put together to begin braiding they alternate as to direction of spiral or cross-over. The result is that in braiding, the sling, identically spiraled sling members are braided together.

Where the expression ". . . associating together an even number of units, half of said units being spiraled in one direction and half of said units being spiraled in the opposite direction . . ." is used in the claims, it is understood that these units might be made by having been initially spiraled some in a direction opposite to that in which the others were spiraled, or they may all have been initially spiraled in the same direction and when associated together before braiding into the sling, one-half of the units may be reversed in direction with respect to the other half to give the desired effect. Claims in which this expression appears are, therefore, not to be limited to the use of units which were spiraled, some in one direction and some in another direction but cover equally well the use of units spiraled all in the same direction and half having been reversed with respect to the others, end for end.

In forming the unit of Figure 1 into the spiraled unit of Figure 3, one rope is laid about the other. In a short rope the operation begins near the center of the unit and the reverse crossings, as shown for example in Figure 2, commence adjacent the ends of the unit. The laying over of the rope is continued and the spiral is built toward the center to make the unit of Figure 2. Where long units are involved, one suitable procedure is that in which two operators perform the work of spiraling, one operator being stationed near each end of the unit and working toward the center as the work progresses.

I claim:

1. The method of forming a sling which comprises the following steps: Forming a plurality of endless units, thereafter oppositely spiraling each unit from its center toward its ends, associating together an even number of units, reversing one half of said units end to end with respect to the other units to reverse the direction of spiralling of half the units with respect to that of the other half, bending each unit to form an initial eye in the center of each unit and to form of each unit two sling members, braiding the members together to form the completed sling, a member of each unit being braided with a member of an opposite unit.

2. The method of forming a sling which comprises the following steps: Forming a plurality of endless units, thereafter oppositely spiraling each unit from its center toward its ends, initially associating together an even number of units, reversing one half of said units end to end with respect to the other units to reverse the direction of spiralling of half the units with respect to that of the other half, bending each unit to form an initial eye in the center of each unit and to form of each unit two sling members, braiding the members together to form the completed sling, a member of each unit being braided with an identically spiraled member of an opposite unit.

3. The method of forming a sling which comprises the following steps: Forming a plurality of endless units, thereafter oppositely spiraling each unit from its center toward its ends by laying one side of each unit about the other side of the same unit alternately, associating together an even number of units, reversing one half of said units end to end with respect to the other units to reverse the direction of spiralling of half the units with respect to that of the other half, bending each unit to form an initial eye in the center of each unit, and to form of each unit two sling members, braiding the members together to form the completed sling, one sling member of each unit being braided with a member of an opposite unit.

4. The method of forming a sling which comprises the following steps: Forming a plurality of endless units, thereafter oppositely spiraling each unit from its center toward its ends, by laying one side of each unit about the other side of the same unit alternately, associating together an even number of units, reversing one half of said units end to end with respect to the other units to reverse the direction of spiralling of half the units with respect to that of the other half, bending each unit to form an initial eye in the center of each unit and to form of each unit two sling members, braiding the units together to form the completed sling, one sling member of each unit being braided with an identically spiraled sling member of an opposite unit.

5. The method of forming a sling which comprises the following steps: Forming a plurality of endless units, thereafter oppositely spiraling each unit from its center toward its ends, leaving an open eye in each end of each unit, associating together an even number of units, reversing one half of said units end to end with respect to the other units to reverse the direction of spiralling of half the units with respect to that of the other half, bending each unit to bring the eyes of each unit adjacent each other, to form an initial eye in the center of each unit, and to form of each unit two sling members, braiding the sling members together to form the completed sling, a member of each unit being braided with a member of an opposite unit.

6. The method of forming a sling which comprises the following steps: Forming a plurality of endless units, thereafter oppositely spiraling each unit from its center toward its ends, leaving an open eye in each end of each unit, associating together an even number of units, reversing one half of said units end to end with respect to the other units to reverse the direction of spiralling of half the units with respect to that of the other half, bending each unit to bring the eyes of each unit adjacent each other, to form an initial eye in the center of each unit and to form of each unit two sling members, braiding the units together to form the completed sling, a sling member of each unit being braided with a sling member of an opposite unit, and upon completion of the braiding binding together the open eyes of each end of each unit to form a second eye for the sling.

7. The method of forming a sling which comprises the following steps: Forming a plurality of endless units, thereafter oppositely spiraling each unit from its center toward its ends, leaving an open eye in each end of each unit, associating together an even number of units, reversing one half of said units end to end with respect to the other units to reverse the direction of spiralling of half the units with respect to that of the other half bending each unit to bring the eyes of each unit adjacent each other, to form an initial eye in the center of each unit, and to form of each unit two sling members, braiding the units together to form the completed sling, a sling member of each unit being braided with an identically spiraled sling member of an opposite unit, and upon completion of the braiding binding together the open eyes of each unit to form a second eye for the sling.

8. The method of forming a sling which comprises the following steps: Forming a plurality of endless units, thereafter oppositely spiraling each unit from its center toward its ends, by laying one side of each unit about the other side of the same unit alternately, leaving an open eye in each end of each unit, associating together an even number of units, bending each unit to bring the eyes of each unit adjacent each other, to form an initial eye in the center of each unit, and to form of each unit two sling members, braiding the units together to form the completed sling, a sling member of each unit being braided with an identically spiraled sling member of an opposite unit, and upon completion of the braiding binding together the open eyes of each end of each unit to form a second eye for the sling.

9. A sling including a plurality of endless units, each unit being folded on itself to produce sling members and being spiraled from its center toward its ends, the spiraling toward one end being in the direction opposite to that toward the other end, the units being spirally interwoven to form a sling.

10. A sling including a plurality of endless units, each unit being folded on itself to produce sling members and being spiraled from its center toward its ends, the spiraling toward one end being in the direction opposite to that toward the other end, whereby in each unit the spiraling in one direction is with the lay of the rope and that in the other direction is counter to the lay of the rope, the units being spirally interwoven to form a sling.

11. A sling including a plurality of endless units, each unit being folded on itself to produce sling members and being spiraled from its center toward its ends, the spiraling toward one end being in the direction opposite to that toward the other end, the units being spirally interwoven with identically spiraled units, to form a sling, the sling members of the several units being gathered together to form eyes at the opposite ends of the sling.

12. A sling including a plurality of endless units, each unit being folded on itself to produce sling members and being spiraled from its center toward its ends, the spiraling toward one end being in the direction opposite to that toward the other end, whereby in each unit the spiraling in one direction is with the lay of the rope and that in the other direction is counter to the lay of the rope, the units being spirally interwoven with identically spiraled units to form a sling.

13. A sling including a plurality of endless units, each unit being folded on itself to produce sling members and being spiraled from its center toward its ends, the spiraling toward one end being in the direction opposite to that toward the other end, whereby in each unit the spiraling in one direction is with the lay of the rope and in the other direction is counter to the lay of the rope, the units being spirally interwoven with identically spiraled units to form a sling, the ends of the several units being gathered together to form eyes at the opposite ends of the sling.

14. The method of forming a sling which comprises the following steps: Forming a plurality of endless units, thereafter spiralling each unit and forming within it a portion spiralled in one direction from the center toward the end and a second portion oppositely spiralled from the center toward the opposite end, so associating together a number of said units for formation into a sling that the direction of spiralling of one half the ends of said units is reversed with respect to the direction of spiralling of the other half of the ends of said units, bending each unit to form an initial eye at its center and to form of each unit two sling members, roping the members together to form the completed sling, a member of each unit being roped with a member of an opposite unit.

JOSEPH McCLINTOCK GARRIS.